(12) United States Patent
Tsukagoshi

(10) Patent No.: US 10,924,784 B2
(45) Date of Patent: Feb. 16, 2021

(54) TRANSMITTING DEVICE, TRANSMITTING METHOD, RECEIVING DEVICE, AND RECEIVING METHOD

(71) Applicant: SONY CORPORATION, Tokyo (JP)

(72) Inventor: Ikuo Tsukagoshi, Tokyo (JP)

(73) Assignee: SONY CORPORATION, Tokyo (JP)

(*) Notice: Subject to any disclaimer, the term of this patent is extended or adjusted under 35 U.S.C. 154(b) by 18 days.

(21) Appl. No.: 16/324,760

(22) PCT Filed: Aug. 17, 2017

(86) PCT No.: PCT/JP2017/029499
§ 371 (c)(1),
(2) Date: Feb. 11, 2019

(87) PCT Pub. No.: WO2018/043143
PCT Pub. Date: Mar. 8, 2018

(65) Prior Publication Data
US 2019/0174151 A1 Jun. 6, 2019

(30) Foreign Application Priority Data
Aug. 30, 2016 (JP) ................... 2016-168407

(51) Int. Cl.
*H04N 21/236* (2011.01)
*H04N 21/4725* (2011.01)
(Continued)

(52) U.S. Cl.
CPC .......... *H04N 21/236* (2013.01); *H04N 19/21* (2014.11); *H04N 19/70* (2014.11); *H04N 21/4725* (2013.01)

(58) Field of Classification Search
CPC ...... H04N 21/236; H04N 19/21; H04N 19/70; H04N 21/4725
See application file for complete search history.

(56) References Cited

U.S. PATENT DOCUMENTS 6,151,413 A * 11/2000 Jang .................... G06T 9/20
382/243
7,009,579 B1 3/2006 Kondo et al.
(Continued)

FOREIGN PATENT DOCUMENTS

EP 1 906 670 A2 4/2008
JP 2000-69442 A 3/2000
(Continued)

OTHER PUBLICATIONS

International Search Report dated Oct. 24, 2017 in PCT/JP2017/029499 filed Aug. 17, 2017.
(Continued)

*Primary Examiner* — Nasser M Goodarzi
*Assistant Examiner* — Adil Ocak
(74) *Attorney, Agent, or Firm* — Oblon, McClelland, Maier & Neustadt, L.L.P.

(57) ABSTRACT

A receiving side can perform interactive processing based on information of an object. Image data is coded to obtain a video stream having coded image data. The video stream is transmitted in a state of being added with information of an object detected on the basis of image data. For example, information of an object includes coded data obtained by coding one-bit data showing a shape of the object, information of a region that is a rectangular area enclosing the object, display priority information of the region, text information that explains the object, and the like. The receiving side can acquire information of an object without the need of detecting an object by processing image data, and without depending on its own performance, and is allowed to perform interactive processing based on information of an object in an excellent manner.

11 Claims, 19 Drawing Sheets

(51) Int. Cl.
   *H04N 19/70*    (2014.01)
   *H04N 19/21*    (2014.01)

(56) References Cited

U.S. PATENT DOCUMENTS

| | | | |
|---|---|---|---|
| 7,042,471 B2* | 5/2006 | Glass | H04N 21/234318 |
| | | | 345/629 |
| 7,536,706 B1 | 5/2009 | Sezan et al. | |
| 2001/0013952 A1* | 8/2001 | Boon | H04N 19/423 |
| | | | 375/240.08 |
| 2005/0206581 A1 | 9/2005 | Kondo et al. | |
| 2007/0103387 A1 | 5/2007 | Kondo et al. | |
| 2007/0195097 A1* | 8/2007 | Heesemans | H04N 21/234318 |
| | | | 345/473 |
| 2010/0162303 A1 | 6/2010 | Cassanova | |

FOREIGN PATENT DOCUMENTS

| | | |
|---|---|---|
| JP | 2003-18591 A | 1/2003 |
| JP | 2015-46089 A | 3/2015 |

OTHER PUBLICATIONS

Extended European Search Report dated May 23, 2019 in Patent Application No. 17846151.3, 9 pages.

* cited by examiner

FIG. 4
(a)
region layer priority index
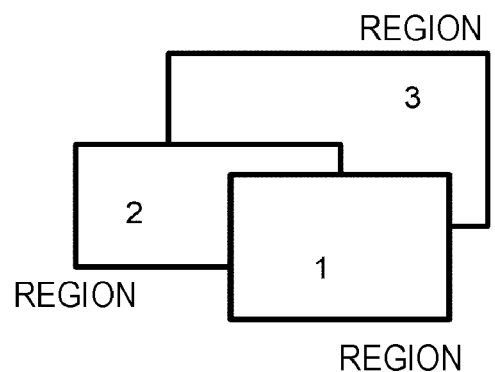
(b)
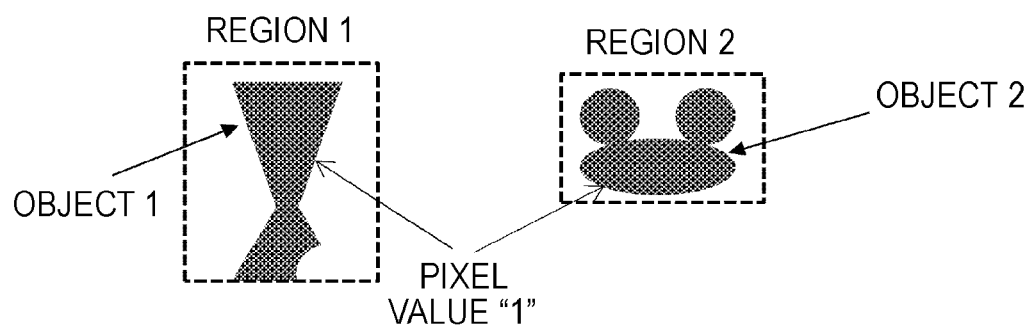

FIG. 6

Semantic_region_data SYNTAX

| Syntax | Size | Type |
|---|---|---|
| semantic_region_data() { | | |
|   information_id (= "semantic_region_positioning") | 8 | uimsbf |
|   semantic_region_length | 16 | uimsbf |
|   semantic_region_positioning() | | |
|   semantic_region_coded_data() | | |
| } | | |

Semantic_region_data SYNTAX

| Syntax | Size | Type |
|---|---|---|
| semantic_region_positioning(){ | | |
| number_of_semantic_regions | 8 | uimsbf |
| for ( I = 0; I < number_of_semantic_regions ; I++){ | | |
| region_id | 16 | uimsbf |
| region first block position | 16 | uimsbf |
| region_block_horizontal_width | 16 | uimsbf |
| region_block_vertical_height | 16 | uimsbf |
| } | | |
| } | | |

(b)

SEMANTICS number_of_semantic_regions
    SHOWING THE NUMBER OF SEMANTIC REGIONS.
region_id   SHOWING IDENTIFICATION NUMBER OF SEMANTIC REGIONS.
region first block position
    SHOWING POSITION OF CODED BLOCK INCLUDING START POINT OF SEMANTIC REGION IN PICTURE.
    IN EXAMPLE OF Fig. 3, BLOCK ASSIGNED WITH BLOCK NUMBER OF SECOND ROW AND THIRD COLUMN
    FROM top-left IS START BLOCK OF region 1, AND BLOCK ASSIGNED WITH BLOCK NUMBER OF FOURTH ROW
    AND FOURTH COLUMN IS START BLOCK OF region 2.
region_block_horizontal_width
    SIZE IN HORIZONTAL DIRECTION IN UNITS OF BLOCKS
region_block_vertical_height
    SIZE IN VERTICAL DIRECTION IN UNITS OF BLOCKS

FIG. 8

Semantic_region_data SYNTAX 3

| Syntax | Size | Type |
|---|---|---|
| semantic_region_coded_data() { | | |
| number_of_semantic_regions | 16 | uimsbf |
| for (I = 0; I < number_of_semantic_regions ; I++){ | | |
| region_id | 16 | uimsbf |
| number_of_coded_blocks (EQUIVALENT TO prediction block) | 16 | uimsbf |
| number_of_smallblock_per_coded_block (EQUIVALENT TO CONVERSION BLOCK) | 4 | uimsbf |
| luma_bitdepth | 2 | uimsbf |
| reserved | 2 | |
| for (i=0; i< number_of_coded_blocks; i++){ | | |
| mv1(ref_pic_id) | 16 | uimsbf |
| mv2(ref_pic_id) | 16 | uimsbf |
| for (j=0; j< number_of_smallblock_per_coded_block; j++){ | | |
| data_coding(luma_bitdepth) | | |
| } | | |
| } | | |
| } | | |
| } | | |

FIG. 9

```
SEMANTICS
  number_of_coded_blocks
      SHOWING THE NUMBER OF CODED BLOCKS. CODED BLOCK IS UNIT OF
      PERFORMING MOTION PREDICTION BETWEEN PICTURES, AND IS EQUIVALENT TO prediction block.
  number_of_smallblock_per_coded_block
      SHOWING THE NUMBER OF smallblock_per_coded_block. smallblock_per_coded_block IS
      UNIT OF PERFORMING INTEGER CONVERSION AND IS EQUIVALENT TO CONVERSION BLOCK.
  luma_bitdepth
      BIT LENGTH OF LUMINANCE DATA SHOWN BY 0 TO 3 WHERE 0 SHOWS 1 bit AND
      THIS MODE IS SET WHEN SHAPE OF OBJECT IS EXPRESSED.
  mv1(), mv2()
      SHOWING TWO MOTION VECTORS. NOTE THAT ref_pic_id IS ID OF REFERENCE PICTURE
      INDICATED BY MOTION VECTOR.
  data_coding()
      CONVERTED CODED DATA OF DIFFERENCE DATA THAT HAS BEEN QUANTIZED.
```

FIG. 10 semantic_region_information SYNTAX

| Syntax | Size | Type |
|---|---|---|
| semantic_region_information() { | | |
|   information_id (= "semantic_region") | 8 | uimsbf |
|   semantic_region_length | 8 | uimsbf |
|   number_of_semantic_regions | 8 | uimsbf |
|   for (l = 0; l < number_of_semantic_regions ; l++){ | | |
|     region_id | 8 | uimsbf |
|     region_layer_priority_index | 8 | uimsbf |
|     tL_x | 16 | uimsbf |
|     tL_y | 16 | uimsbf |
|     bR_x | 16 | uimsbf |
|     bR_y | 16 | uimsbf |
|     text_length | 8 | uimsbf |
|     for (m = 0; m < text_length; m++){ | | |
|       text_byte | 8 | uimsbf |
|     } | | |
|   } | | |
| } | | |

FIG. 11

```
Semantics
number_of_semantic_regions (8bits)
        SHOWING THE NUMBER OF SEMANTIC REGIONS.
region_id (8bits)
        SHOWING IDENTIFICATION NUMBER OF SEMANTIC REGION.
region_layer_priority_index(8bits)
        POSITIVE VALUE SHOWING DISPLAY PRIORITY INFORMATION BETWEEN SEMANTIC REGIONS.
        HIGHER DEGREE OF PRIORITY IS PLACED AS VALUE IS SMALLER.
tL_x (16bits)
        SHOWING top-left x-COORDINATE OF SEMANTIC REGION (COORDINATE VALUE IN UNITS OF PIXELS WITH top-left OF IMAGE AS START POINT).
tL_y (16bits)
        SHOWING top-left y-COORDINATE OF SEMANTIC REGION (COORDINATE VALUE IN UNITS OF PIXELS WITH top-left OF IMAGE AS START POINT).
bR_x(16bits)
        SHOWING bottom-right x-COORDINATE OF SEMANTIC REGION (COORDINATE VALUE IN UNITS OF PIXELS WITH top-left OF IMAGE AS START POINT).
bR_y(16bits)
        SHOWING bottom-right y-COORDINATE OF SEMANTIC REGION (COORDINATE VALUE IN UNITS OF PIXELS WITH top-left OF IMAGE AS START POINT).
text_length(8bits)
        SHOWING SIZE OF TEXT INFORMATION.
```

TRANSMITTING DEVICE, TRANSMITTING METHOD, RECEIVING DEVICE, AND RECEIVING METHOD

TECHNICAL FIELD

The present technology relates to a transmitting device, a transmitting method, a receiving device, and a receiving method, and, in particular, to a transmitting device that transmits information of an object included in a video image, and the like.

BACKGROUND ART

For example, Patent Document 1 and the like describe a technique of detecting a person and other objects from a video image by segmentation processing.

CITATION LIST

Patent Document

Patent Document 1: Japanese Patent Application Laid-Open No. 2015-046089

SUMMARY OF THE INVENTION

Problems to be Solved by the Invention

An object of the present technology is to allow a receiving side to perform interactive processing based on information of an object in an excellent manner on a receiving side.

Solutions to Problems

A concept of the present technology lies in a transmitting device that includes:

an image encoding unit configured to code image data to obtain a video stream having coded image data; and a transmitting unit configured to transmit the video stream in a state of being added with information of an object detected on the basis of the image data.

In the present technology, the image encoding unit codes image data to obtain a video stream having coded image data. The transmitting unit transmits a video stream in a state of being added with information of an object detected on the basis of image data. Here, an object is detected by conventional and well-known segmentation processing applied to image data.

For example, the information of an object may include coded data obtained by coding one-bit data showing a shape of the object. Furthermore, for example, the object information may include information of a region (semantic region) that is a rectangular area enclosing an object. In this case, for example, the object information may further include display priority information of the region. Furthermore, for example, the object information may include text information that explains the object.

As described above, in the present technology, information of an object detected on the basis of image data is transmitted together with a video stream having coded image data obtained by coding the image data. Therefore, a receiving side can acquire information of an object without the need of detecting an object by processing the image data, and without depending on its own performance, and is allowed to perform interactive processing based on the information of an object in an excellent manner.

Note that in the present technology, for example, information of an object may be transmitted by being inserted into a video stream. For example, in this case, the object information at least includes coded data obtained by coding one-bit data showing a shape of the object and information of a region that is a rectangular area enclosing the object, and the coded data may be inserted into a first area in the video stream, and the information of a region may be inserted into a second area that is different from the first area in the video stream. With the information of an object inserted into the video stream as described above, associating the video stream with the information of an object is facilitated.

Furthermore, another concept of the present technology lies in a receiving device including a receiving unit configured to receive a video stream having coded image data obtained by coding image data, in which the video stream is added with information of an object detected on the basis of the image data.

The receiving device further includes a control unit configured to control interactive processing performed on the basis of the information of an object.

In the present technology, the receiving unit receives a video stream having coded image data obtained by coding the image data. Information of an object detected on the basis of the image data is added to the video stream. The control unit controls interactive processing performed on the basis of the information of an object.

For example, the interactive processing may be processing of highlighting a predetermined object selected on the basis of the information of an object. Furthermore, for example, the interactive processing may be processing of acquiring predetermined information by analyzing an image of a predetermined object selected on the basis of the information of an object. Furthermore, for example, the interactive processing may be processing of displaying information relating to a predetermined object selected on the basis of the information of an object.

As described above, in the present technology, interactive processing is performed on the basis of the information of an object sent by being added to a video stream. Therefore, information of an object can be acquired without the need of detecting an object by processing image data, and without depending on own performance, and interactive processing based on information of an object may be performed in an excellent manner.

Furthermore, another concept of the present technology lies in a receiving device including:

a receiving unit configured to receive a video stream having coded image data obtained by coding image data; and a control unit configured to control processing of detecting information of an object on the basis of the image data obtained by decoding the coded image data, and interactive processing performed on the basis of the information of an object.

In the present technology, the receiving unit receives a video stream having coded image data obtained by coding the image data. The control unit controls processing of detecting information of an object on the basis of image data obtained by decoding coded image data and interactive processing performed on the basis of the information of an object.

As described above, in the present technology, information of an object is detected on the basis of image data obtained by decoding coded image data and interactive processing is performed on the basis of the information of an object. Therefore, even when information of an object is not transmitted, interactive processing based on the information of an object may be performed in an excellent manner.

Effects of the Invention

According to the present technology, a receiving side is allowed to perform interactive processing based on information of an object in an excellent manner. Note that the effects described here is not always limited, and may be any of effects described in the present disclosure.

BRIEF DESCRIPTION OF DRAWINGS

FIG. 4 is a diagram for explaining "region layer priority index" showing a display priority degree and one-bit data showing a shape of an object.

FIG. 6 is a diagram showing a structure example of semantic region data arranged in a payload of a NAL unit of a slice that is newly defined.

FIG. 7 is a diagram showing a structure example of semantic region positioning and a content of main information in the structure example.

FIG. 8 is a diagram showing a structure example of semantic region coded data.

FIG. 9 is a diagram showing a content of main information in the structure example of semantic region coded data.

FIG. 10 is a diagram showing a structure example of semantic region information arranged in a payload of a NAL unit of SEI that is newly defined.

FIG. 11 is a diagram showing a content of main information in the structure example of semantic region information.

MODE FOR CARRYING OUT THE INVENTION

Hereinafter, a mode for performing the invention (hereinafter referred to as "embodiment") will be described. Note that a description will be made in the order described below.
1. Embodiment
2. Variation

1. EMBODIMENT

[Transmitting and Receiving System]

Figure 1:
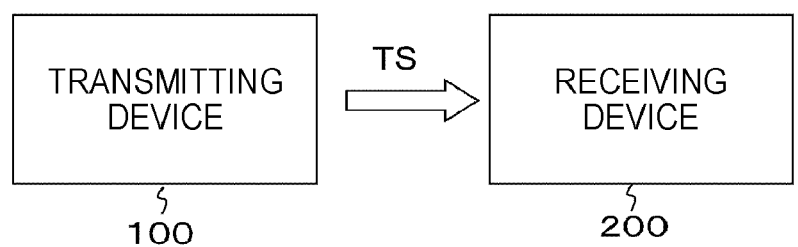
FIG. 1 is a block diagram showing a configuration example of a transmitting and receiving system according to an embodiment.

FIG. 1 shows a configuration example of a transmitting and receiving system 10 according to an embodiment. The transmitting and receiving system 10 is configured with a transmitting device 100 and a receiving device 200.

The transmitting device 100 transmits a transport stream TS as a container on a broadcast wave. The transport stream TS includes a video stream having coded image data. Information of a person and other objects detected on the basis of image data is added to the video stream. For example, an object is detected by conventionally well-known segmentation processing applied to image data.

Information of an object includes one-bit coded data obtained by coding one-bit data showing a shape of the object, information of a semantic region) (hereinafter referred to as "region" as appropriate) which is a rectangular area enclosing the object, display priority information of the region, text information that explains the object, and the like.

Information of an object can also be considered to be transmitted by a stream other than a video stream. In the present embodiment, information of an object is transmitted by being inserted into a video stream. Specifically, one-bit coded data is inserted by using a NAL unit of a slice that is newly defined, and other pieces of information are inserted by using a NAL unit of SEI that is newly defined.

The receiving device 200 receives the transport stream TS described above that is sent on a broadcast wave from the transmitting device 100. The transport stream TS includes a video stream having coded image data as described above. Then, information of an object detected on the basis of image data is inserted into the video stream.

The receiving device 200 controls interactive processing on the basis of information of an object. Here, for example, the interactive processing is processing of highlighting a predetermined object selected on the basis of information of an object, processing of acquiring predetermined information by analyzing an image of a predetermined object selected on the basis of information of an object, processing of displaying information relating to a predetermined object selected on the basis of object information, and the like.

"Configuration of Transmitting Device"

Figure 2:
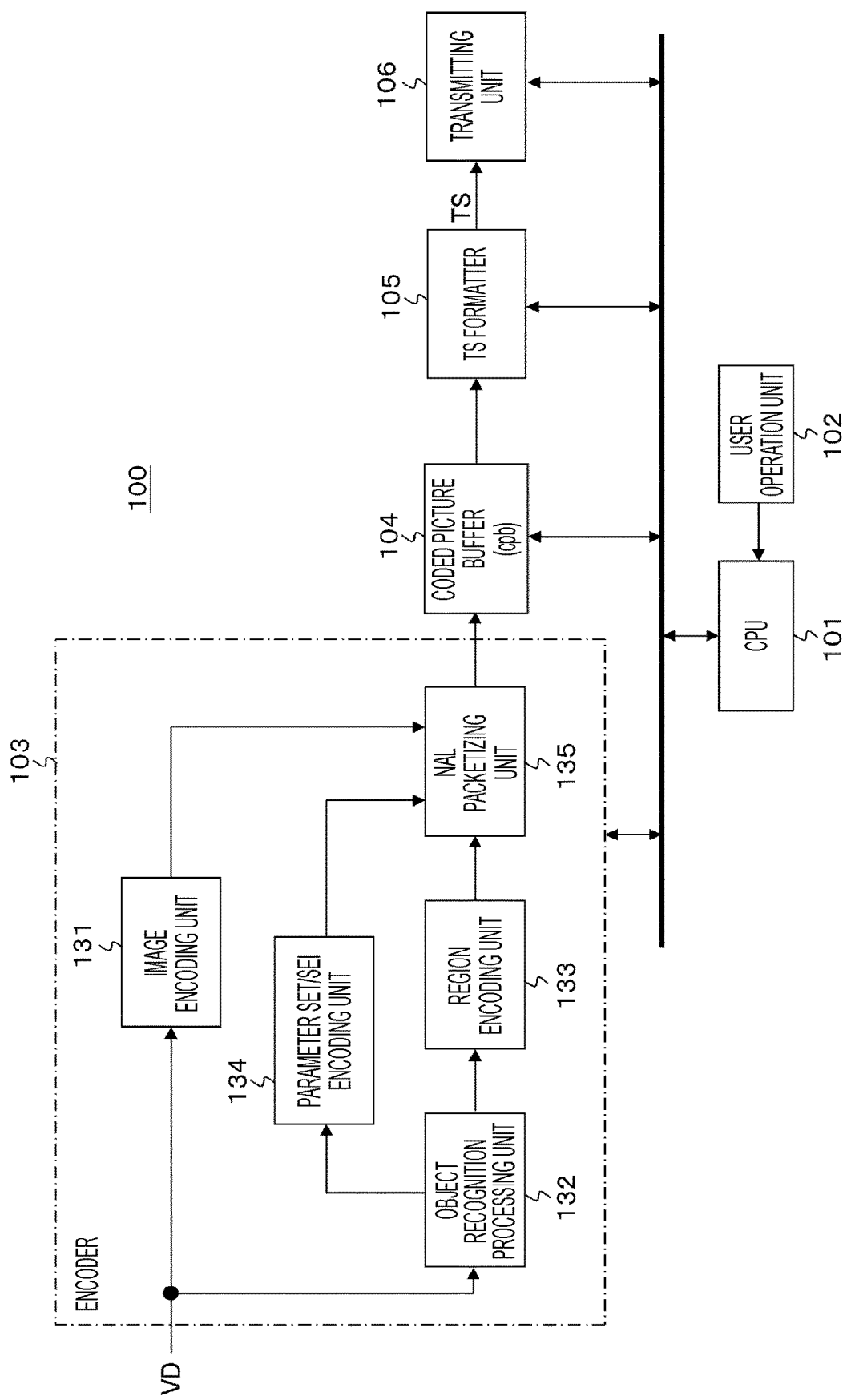
FIG. 2 is a block diagram showing a configuration example of a transmitting device.

FIG. 2 shows a configuration example of the transmitting device 100. The transmitting device 100 includes a central processing unit (CPU) 101, a user operation unit 102, an encoder 103, a coded picture buffer (cpb) 104, a TS formatter 105, and a transmitting unit 106.

The CPU 101 is a control unit and controls operation of each unit of the transmitting device 100. The user can perform a variety of input operations on the user operation unit 102. For example, text information for explaining an object recognized by an object recognition processing unit 132 as described later can be input from the user operation unit 102.

The encoder 103 receives input of video data VD, and codes the video data VD to obtain coded image data. Furthermore, the encoder 103 obtains information of an object on the basis of the video data VD. Then, the encoder 103 generates a video stream having coded image data and information of an object. The information of an object includes one-bit coded data obtained by coding one-bit data showing a shape of the object, information of a region that is a rectangular area enclosing the object, display priority information of the region, text information that explains the object, and the like.

The encoder 103 includes an image encoding unit 131, the object recognition processing unit 132, a region encoding unit 133, a parameter set/SEI encoding unit 134, and a NAL packetizing unit 135. The image encoding unit 131 codes video data to obtain coded image data.

The object recognition processing unit 132 applies conventionally well-known segmentation processing to the video data VD to detect an object. The object is a section having a meaning in an image (picture), and a person or other things. Note that what object is to be detected by the object recognition processing unit 132 can be designated by inputting operations from the user operation unit 102.

The object recognition processing unit 132 sets a region that is a rectangular area enclosing a detected object on an image. This region includes one object in its area. An area of the region is expressed by start point coordinates (top-left coordinates) and end point coordinates (bottom-right coordinates).

Figure 3:
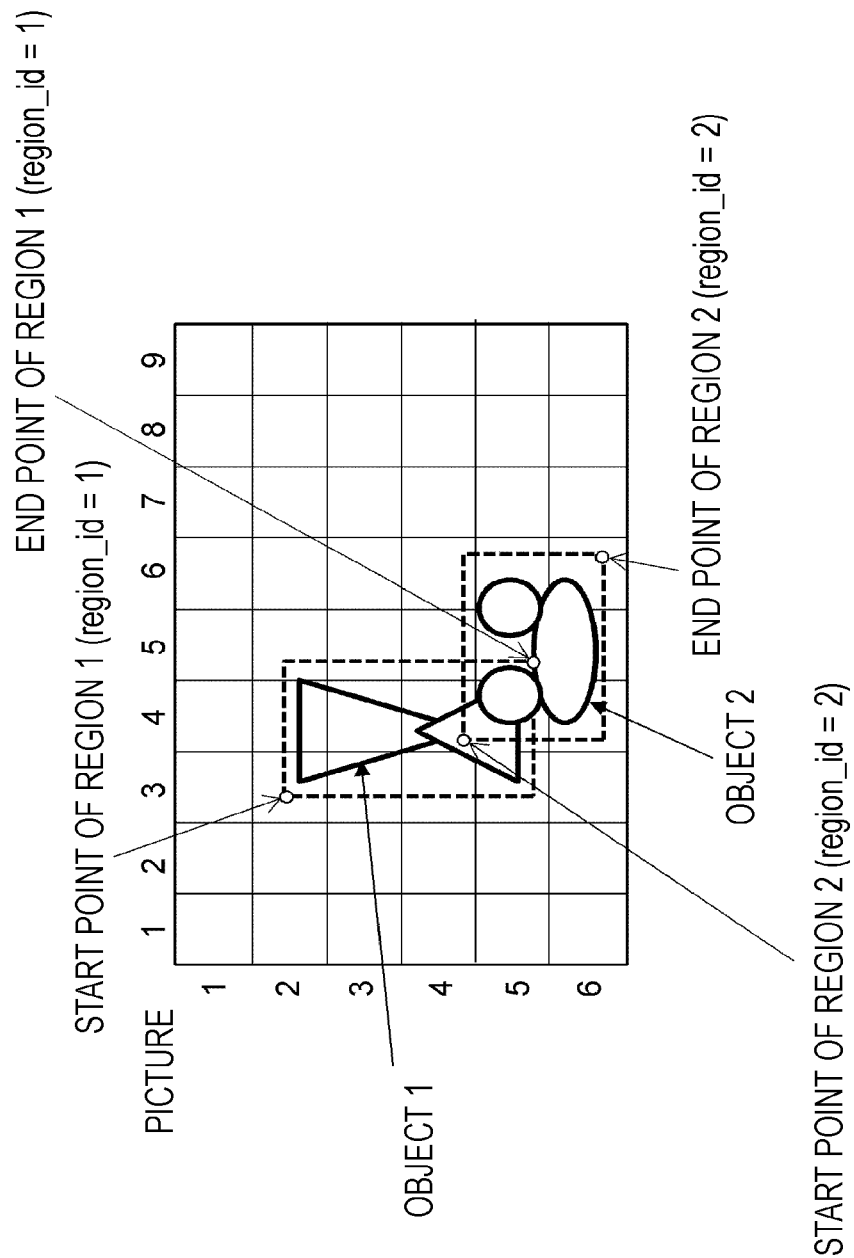
FIG. 3 is a diagram showing an example of region setting.

FIG. 3 shows an example of region setting. This example shows a case where two objects, objects 1 and 2, are detected in an image. Note that each square shows a coded block.

A region 1 that is a rectangular area enclosing the object 1 is set. A region ID (region_id) of the region 1 is "1". Furthermore, a region 2 that is a rectangular area enclosing the object 2 is set. A region ID (region_id) of the region 2 is "2".

Each region can exist in a partially overlapping manner. The object recognition processing unit 132 sets "region layer priority index" showing a display priority degree of each region. A region with a smaller value of the "region layer priority index" is positioned closer to the front and categorized preferentially. FIG. 4(*a*) shows an example where three regions exist in a partially-overlapping manner.

Furthermore, the object recognition processing unit 132 sets text information for explaining an object for each object on the basis of text information input from the user operation unit 102.

Furthermore, the object recognition processing unit 132 outputs one-bit data showing a shape of an object for each object. In this case, as shown in FIG. 4(*b*), a pixel value of a pixel corresponding to an object is "1", and a pixel value of other pixels is "0".

The region encoding unit 133 codes one-bit data showing a shape of an object output for each object from the object recognition processing unit 132 to obtain one-bit coded data. Here, the region encoding unit 133 performs coding in relation to a coded block including data of a region for each object to obtain coded data.

For example, in a case of the example shown in FIG. 3, coding is performed in relation to coded blocks (2,3), (2,4), (2,5), (3,3), (3,4), (3,5), (4,3), (4,4), (4,5), (5,3), (5,4), and (5,5) including data of the region 1 for the object 1. On the other hand, coding is performed in relation to coded blocks (5,4), (5,5), (5,6), (6,4), (6,5), and (6,6) including data of the region 2 for the object 2. Note that, here, (a,b) shows the a-th row and the b-th column.

Figure 5:
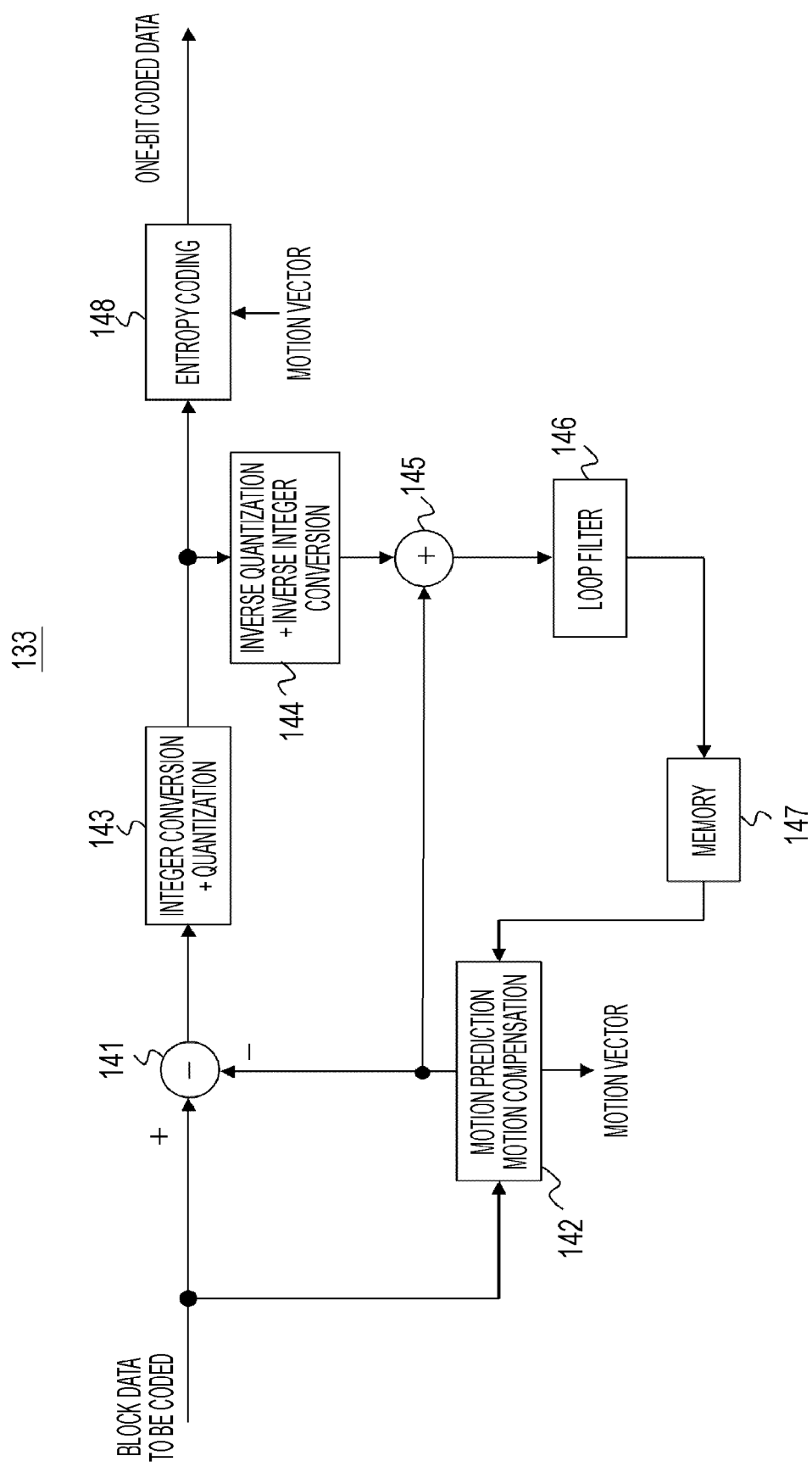
FIG. 5 is a diagram showing a configuration example of a region encoding unit.

FIG. 5 shows a configuration example of the region encoding unit 133. The region encoding unit 133 includes a subtraction circuit 141, a motion prediction/motion compensation circuit 142, an integer conversion/quantization circuit 143, an inverse quantization/inverse integer conversion circuit 144, an addition circuit 145, a loop filter 146, a memory 147, and an entropy coding circuit 148.

Block data to be coded is sequentially supplied to the subtraction circuit 122 for each block. In the motion prediction/motion compensation circuit 142, motion-compensated prediction reference block data is obtained for each block on the basis of image data of a reference picture stored in the memory 147.

The prediction reference block data obtained by the motion prediction/motion compensation circuit 142 is sequentially supplied to the subtraction circuit 141 for each block. In the subtraction circuit 141, subtraction processing is performed between block data to be coded and motion-compensated prediction reference block data for each block, and a prediction error is obtained. This prediction error for each block is applied with integer conversion (for example, DCT conversion) in the integer conversion/quantization circuit 143, and then quantized.

The quantized data for each block obtained in the integer conversion/quantization circuit 143 is supplied to the inverse quantization/inverse integer conversion circuit 144. In the inverse quantization/inverse integer conversion circuit 144, inverse quantization is applied to the quantized data, and also inverse integer conversion is applied, so that a predictive residue is obtained. This prediction error is supplied to the addition circuit 145.

In the addition circuit 145, motion-compensated prediction reference block data is added to the predictive residue, so that block data is obtained. This block data is stored in the memory 147 after quantization noise is removed by the loop filter 146.

Furthermore, quantized data for each block obtained in the integer conversion/quantization circuit 143 is supplied to the entropy coding circuit 148, and applied with entropy coding, so that one-bit coded data is obtained. Note that information, such as a motion vector in each block, is added as MB header information to this one-bit coded data for decoding on a receiving side.

Return to FIG. 2, and the parameter set/SEI encoding unit 134 generates a parameter set, such as VPS, SPS, and PPS, of each picture and SEI. Here, information of an object (information of a region that is a rectangular area enclosing the object, display priority information of a region, and text information that explains the object) output for each object from the object recognition processing unit 132 is also supplied to the parameter set/SEI encoding unit 134. Then, the parameter set/SEI encoding unit 134 also generates SEI including information of each object. Note that each object is the same as each region, since one region includes one object as described above.

The NAL packetizing unit 135 generates a predetermined number of NAL units constituting coded image data for each picture on the basis of a parameter set and SEI generated by the parameter set/SEI encoding unit 134, coded image data generated by the image encoding unit 131, and one-bit coded data generated by the region encoding unit 133, and generates a video stream constituted by coded image data of each picture.

In this case, a predetermined number of NAL units of coded image data constituting each picture include a NAL unit of a conventionally well-known slice having coded image data generated by the image encoding unit 131 as slice data, as well as a NAL unit of a slice that is newly defined having one-bit coded data generated by the region encoding unit 133 as slice data. Furthermore, a predetermined number of the NAL units include a NAL unit of SEI that is newly defined having information of an object (information of a region that is a rectangular area enclosing the object, display priority information of the region, and text information that explains the object). Note that it is not required that both the NAL unit of a slice that is newly defined having one-bit coded data as slice data and the NAL unit of SEI that is newly defined having information of an object are always included, and either one of the NAL units may be included.

FIG. 6 shows a structure example (Syntax) of semantic region data (Semantic_region_data) arranged in a payload of a NAL unit of a slice that is newly defined. An eight-bit field of "information_id" shows that semantic region data is arranged. A sixteen-bit field of "semantic_region_length" shows the number of subsequent bytes as a length (size) of the semantic region data.

A field of semantic region positioning (Semantic_region_positioning( )) and a field of semantic region coded data (Semantic_region_coded_data( )) exist after the field of "semantic_region_length".

FIG. 7(a) shows a structure example of semantic region positioning, and FIG. 7(b) shows a content (semantics) of main information in the structure example. An eight-bit field of "number_of_semantic_regions" shows the number of regions. Then, a sixteen-bit field of "region_id", a sixteen-bit field of "region first block position", a sixteen-bit field of "region_block_horizontal_width", and a sixteen-bit field of "region_block_vertical_height" exist as many as the number of regions.

The field of "region_id" shows an identification number of a region. The field of "region first block position" shows a position of a coded block including a start point of a region in a picture. In the example of FIG. 3, in relation to the region 1, a block assigned with a block number of the second row and the third column from top-left is a start block of the region 1, and a block assigned with a block number of the fourth row and the fourth column from top-left is a start block of the region 2. The field of "region_block_horizontal_width" shows a size in a horizontal direction in units of blocks. The field of "region_block_vertical_height" shows a size in a vertical direction in units of blocks.

FIG. 8 shows a structure example of semantic region coded data, and FIG. 9 shows a content (Semantics) of main information in the structure example. An eight-bit field of "number_of_semantic_regions" shows the number of regions. Then, a sixteen-bit field of "region_id", a sixteen-bit field of "number_of_coded_blocks", a four-bit field of "number_of_smallblock_per_coded_block", a two-bit field of "luma_bitdepth", and the like exist as many as the number of the regions.

The field of "region_id" shows an identification number of a region. The field of "number_of_coded_blocks" shows the number of coded blocks. The coded block shows a unit of performing motion prediction between pictures, and is equivalent to "prediction block". The field of "number_of_smallblock_per_coded_block" shows the number of "smallblock_per_coded_block". "smallblock_per_coded_block" shows a unit of performing integer conversion, and is equivalent to a conversion block. The field of "luma_bitdepth" shows a bit length of luminance data shown by 0 to 3, where 0 shows one bit, and this mode is set in a case where a shape of an object is expressed.

Two fields showing a motion vector, a sixteen-bit field of "mv1(ref_pic_id)" and a sixteen-bit field of "mv2(ref_pic_id)", exist as many as the number of coded blocks shown by the field of "number_of_coded_blocks". Note that "ref_pic_id" is an ID of a reference picture indicated by a motion vector. In a field of "data_coding(luma_bitdepth)", converted coded data of difference data that has been quantized is arranged.

FIG. 10 shows a structure example (Syntax) of semantic region information (Semantic_region_information) arranged in a payload of a NAL unit of SEI that is newly defined. FIG. 11 shows a content (Semantics) of main information in the structure example. An eight-bit field of "information_id" shows that semantic region) information is arranged. A sixteen-bit field of "semantic_region_length" shows the number of subsequent bytes as a length (size) of the semantic region information.

An eight-bit field of "number_of_semantic_regions" shows the number of regions. Subsequent fields exist repeatedly as many as the number of regions. An eight-bit field of "region_id" shows an identification number of a region. An eight-bit field of "region_layer_priority_index" is a positive value showing display priority information between regions. As the value is smaller, a higher priority is set.

A sixteen-bit field of "tL_x" shows a top-left x-coordinate (a coordinate value in units of pixels with the top-left of an image as a start point) of a region. A sixteen-bit field of "tL_y" shows a top-left y-coordinate (a coordinate value in units of pixels with the top-left of an image as a start point) of a region. A sixteen-bit field of "bR_x" shows a bottom-right x-coordinate (a coordinate value in units of pixels with the top-left of an image as a start pointe) of a region. A sixteen-bit field of "bR_y" shows a bottom-right y-coordinate (a coordinate value in units of pixels with the top-left of an image as a start point) of a region.

An eight-bit field of "text_length" shows a character code length (size) showing text information by the number of bytes. A character code is arranged in a field of "text_byte". Text information in this case is text information that explains an object.

Return to FIG. 2, and the coded picture buffer (cpb) 104 temporarily stores a video stream generated by the encoder 103. The TS formatter 105 reads out a video stream stored in the coded picture buffer 104, PES-packetizes the video stream, and further transport-packetizes the video stream for multiplexing, and obtains the transport stream TS as a multiplexed stream. The transmitting unit 106 transmits the transport stream TS obtained by the TS formatter 105 to the receiving device 200 on a broadcast wave or a packet on the net.

Operation of the transmitting device 100 shown in FIG. 2 will be described briefly. The video data VD is input to the encoder 103. The encoder 103 performs coding of the video data VD so that coded image data is obtained. Furthermore, the encoder 103 obtains information of an object on the basis of the video data VD. Then, the encoder 103 generates a video stream having the coded image data and the information of an object.

In this case, the information of an object includes one-bit coded data obtained by coding one-bit data showing a shape of the object, information of a region that is a rectangular area enclosing the object, display priority information of the region, text information that explains the object, and the like.

Here, one-bit coded data generated by the region encoding unit 133 is included as slice data in a NAL unit of a slice that is newly defined (refer to FIGS. 6 to 9). Information of an object (information of a region that is a rectangular area enclosing the object, display priority information of the region, and text information that explains the object) is included in a NAL unit of SEI that is newly defined (refer to FIGS. 10 and 11).

A video stream generated by the encoder 103 is temporarily stored in the coded picture buffer (cpb) 104. The TS formatter 105 reads out a video stream stored in the coded picture buffer 104, PES-packetizes the video stream, and further transport-packetizes the video stream for multiplexing, and obtains the transport stream TS as a multiplexed stream.

The transport stream TS obtained by the TS formatter 105 is sent to the transmitting unit 106. The transmitting unit 106 transmits the transport stream TS obtained by the TS formatter 105 to the receiving device 200 on a broadcast wave or a packet on a net.

"Configuration of Receiving Device"

Figure 12:
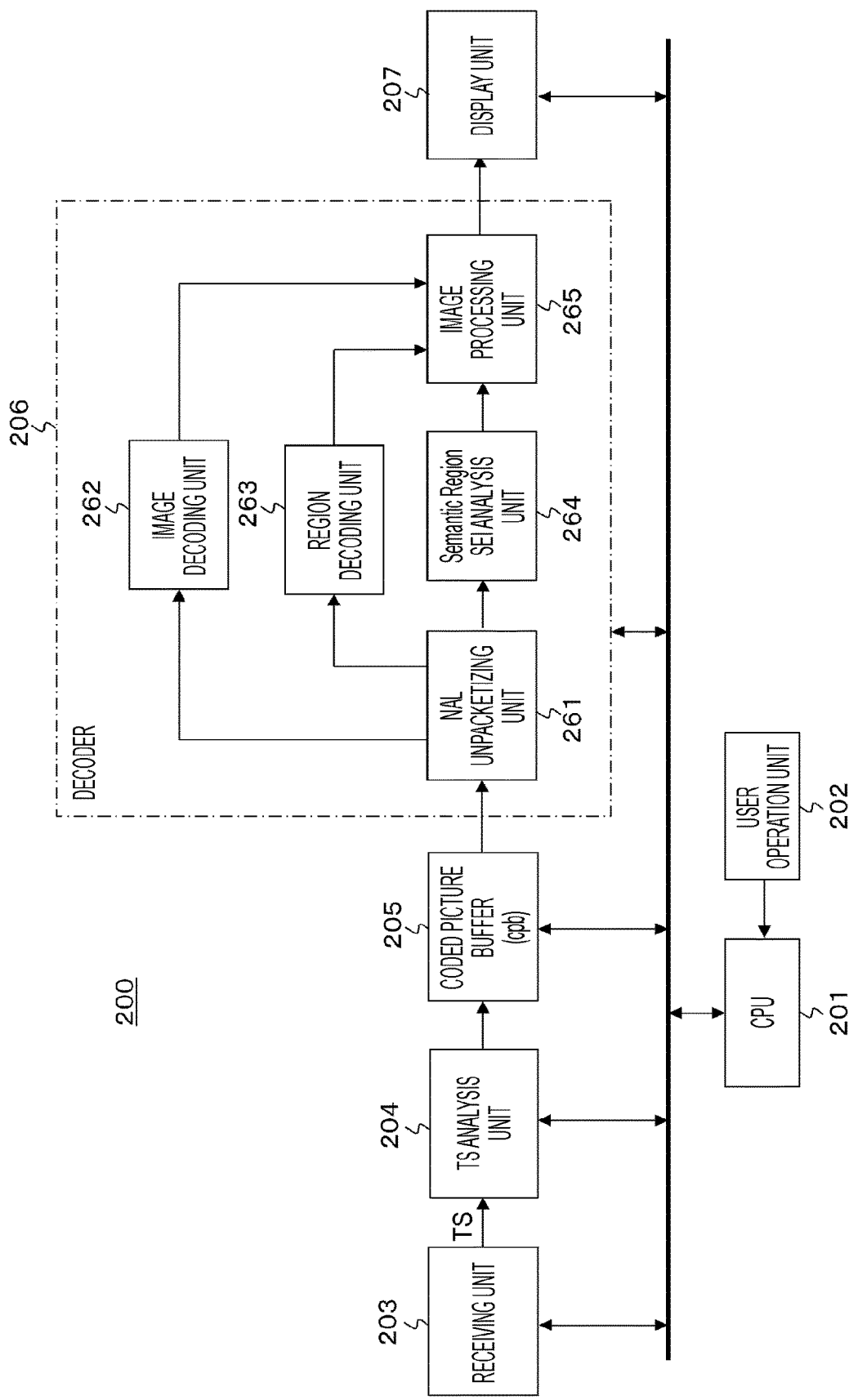
FIG. 12 is a block diagram showing a configuration example of a receiving device.

FIG. 12 shows a configuration example of the receiving device 200. The receiving device 200 includes a central processing unit (CPU) 201, a user operation unit 202, a receiving unit 203, a TS analysis unit 204, a coded picture buffer (cpb) 205, a decoder 206, and a display unit 207. The CPU 201 constitutes a control unit and controls operation of each unit of the receiving device 200. The user can perform a variety of input operations on the user operation unit 202. For example, the user can perform operation relating to interactive processing as described later on the user operation unit 202.

The receiving unit 203 receives the transport stream TS that is sent on a broadcast wave or a packet on a net from the transmitting device 100. The TS analysis unit 204 takes out a video stream included in the transport stream TS, and sends the video stream to the coded picture buffer 205. This video stream includes information of an object together with coded image data for each picture. The coded picture buffer (cpb) 205 temporarily stores a vide stream sent from the TS analysis unit 204.

The decoder 206 reads out and decodes coded image data of each picture stored in the coded picture buffer 205 at a decoding timing provided by a decoding time stamp (DTS) of the picture to obtain image data for display. Furthermore, the decoder 206 performs interactive processing based on information of an object in accordance with user operation to adaptively modify and change the image data for display. The display unit 207 displays an image based on the image data for display from the decoder 206. For example, this display unit 207 is configured with a liquid crystal display (LCD), an organic electro-luminescence panel, or the like. Note that this display unit 207 may be external equipment connected to the receiving device 200.

The decoder 206 has a NAL unpacketizing unit 261, an image decoding unit 262, a region decoding unit 263, a semantic region SEI analysis unit 264, and an image processing unit (browser unit) 265.

The NAL unpacketizing unit 261 takes out slice data, a parameter set, SEI, and the like from a predetermined number of NAL units constituting coded image data of each picture, and sends them to necessary locations.

Here, the NAL unpacketizing unit 261 takes out coded image data of a picture from a NAL unit of a slice that is conventionally well-known, and sends the data to the image decoding unit 262. Furthermore, the NAL unpacketizing unit 261 takes out one-bit coded data from a NAL unit of a slice that is newly defined, and sends the data to the region decoding unit 263. Furthermore, the NAL unpacketizing unit 261 sends a NAL unit of SEI that is newly defined to the semantic region SEI analysis unit 264.

The image decoding unit 262 decodes coded image data sent for each picture from the NAL unpacketizing unit 261 to obtain image data for display. The region decoding unit 263 decodes one-bit coded data of each object sent for each picture from the NAL unpacketizing unit 261 to obtain one-bit data showing a shape of each object.

Figure 13:
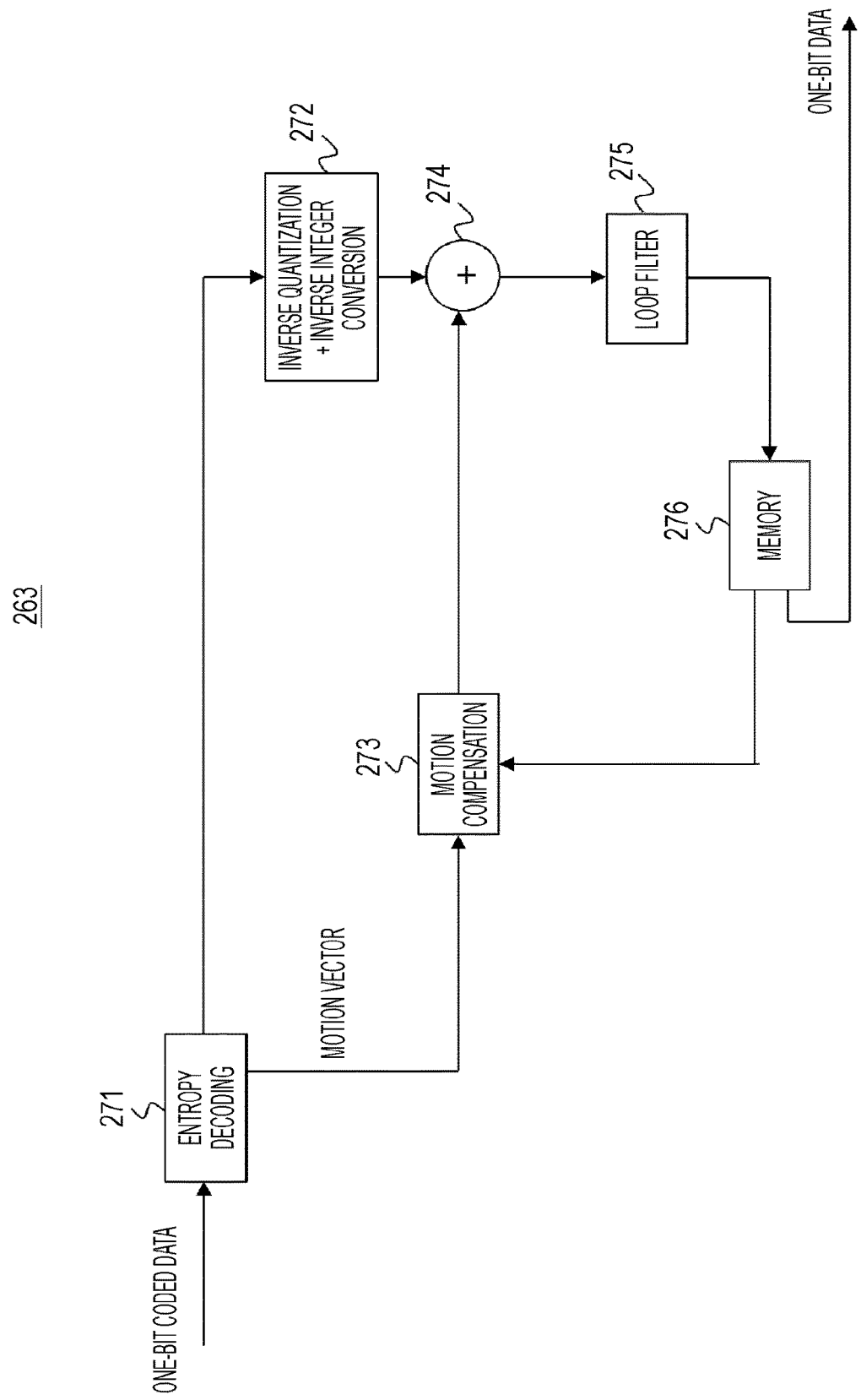
FIG. 13 is a diagram showing a configuration example of a region decoding unit.

FIG. 13 shows a configuration example of the region decoding unit 263. The region decoding unit 263 includes an entropy decoding circuit 271, an inverse quantization/inverse integer conversion circuit 272, a motion compensation circuit 273, an addition circuit 274, a loop filter 275, and a memory 276.

The entropy decoding circuit 271 applies entropy decoding to one-bit coded data of each object to obtain quantized data for each block. This quantized data is supplied to the inverse quantization/inverse integer conversion circuit 272. In the inverse quantization/inverse integer conversion circuit 272, inverse quantization is applied to the quantized data, and also inverse integer conversion is applied, so that a predictive residue is obtained. This prediction error of each block is supplied to the addition circuit 274.

In the motion compensation circuit 273, compensation reference block data applied with motion compensation is obtained on the basis of image data of a reference picture stored in the memory 276. Here, motion compensation is performed by using a motion vector included as MB header information. In the addition circuit 274, compensation reference block data is added to a predictive residue, so that block data is obtained. This block data is stored in the memory 276 after quantization noise is removed by the loop filter 275. Then, by reading out the stored data from the memory 276, one-bit data showing a shape of each object is obtained.

Return to FIG. 12, the semantic region SEI analysis unit 264 analyzes a NAL unit of SEI that is newly defined sent for each picture from the NAL unpacketizing unit 261 to obtain information of each object (information of a region that is a rectangular region enclosing the object, display priority information of a region, and text information that explains the object).

The image processing unit 265 performs image processing on the basis of image data for display obtained by the image decoding unit 262, one-bit data showing a shape of each object obtained by the region decoding unit 263, and information of each object obtained by the semantic region SEI analysis unit 264, and outputs image data for display.

In this case, in normal time, image data for display output from the image processing unit 265 is image data for display obtained by the image decoding unit 262. Furthermore, when interactive processing based on interactive operation by the user is performed, image data for display output from the image processing unit 265 is obtained by adaptively modifying and changing image data for display obtained by the image decoding unit 262.

Interactive processing performed in the image processing unit 265 is controlled by the CPU 201. This control is performed on the basis of an application installed in the CPU. Here, a specific example of the interactive processing will be described.

"1. Object Highlighting (Background Masking)"

Figure 14:
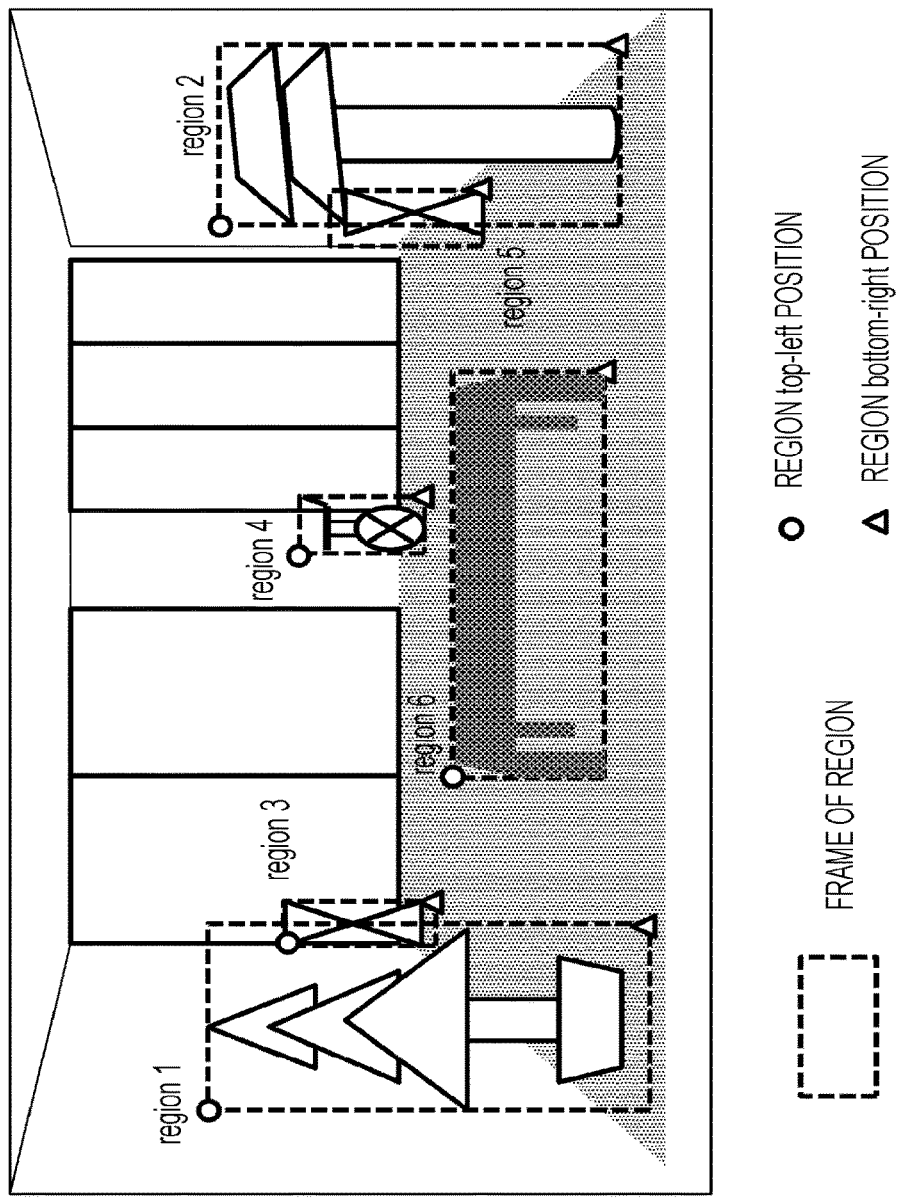
FIG. 14 is a diagram for explaining interactive processing 1 (object highlighting).

In a case of this interactive processing 1, that is, "1. Object highlighting (background masking)", when an operation mode of the interactive processing 1 is set in accordance with user operation, a region frame shown by a broken line is displayed in an image displayed on the display unit 207 as shown in FIG. 14. This region frame is displayed on the basis of information of a region obtained by the semantic region SEI analysis unit 264. In the illustrated example, frames of six regions, from region1 to region6, are displayed.

In this state, when one or a plurality of regions is selected by user operation, an image displayed on the display unit 207 is in a state where an object included in a selected region is highlighted. In this case, modifications and changes are made so that areas other than the selected region area are masked in the image data for display obtained by the image decoding unit 262, and final image data for display is obtained.

Figure 15:
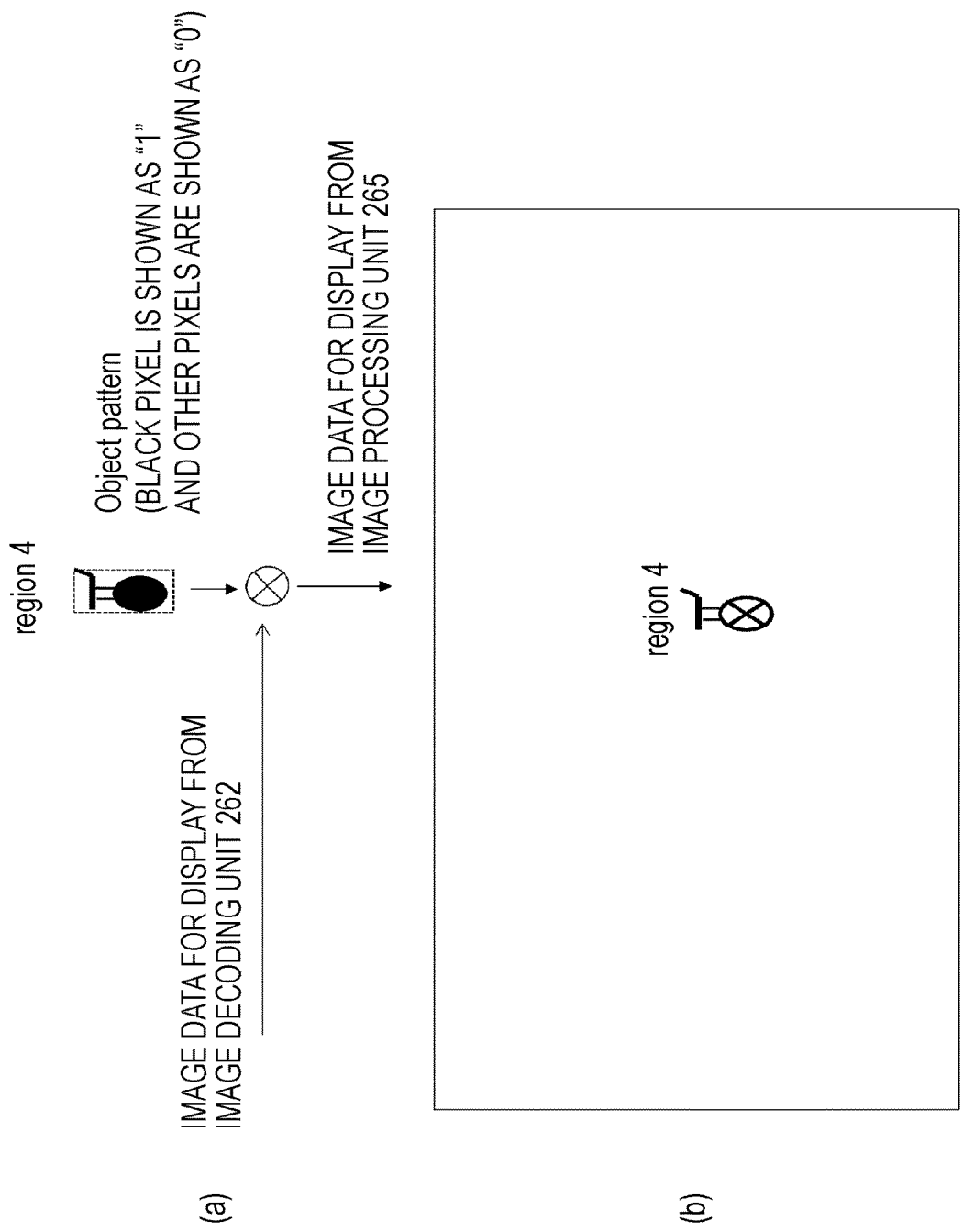
FIG. 15 is a diagram for explaining the interactive processing 1 (object highlighting).

FIG. 15(a) shows masking processing in a case where the region4 is selected. FIG. 15(b) shows an example of an image displayed in the image data for display output from the image processing unit 265. Note that there may be a case where the characters of "region4" are not displayed.

"2. Retrieval by an Object (Cloud, Local Storage)+Extraction of a Characteristic Point"

Figure 16:
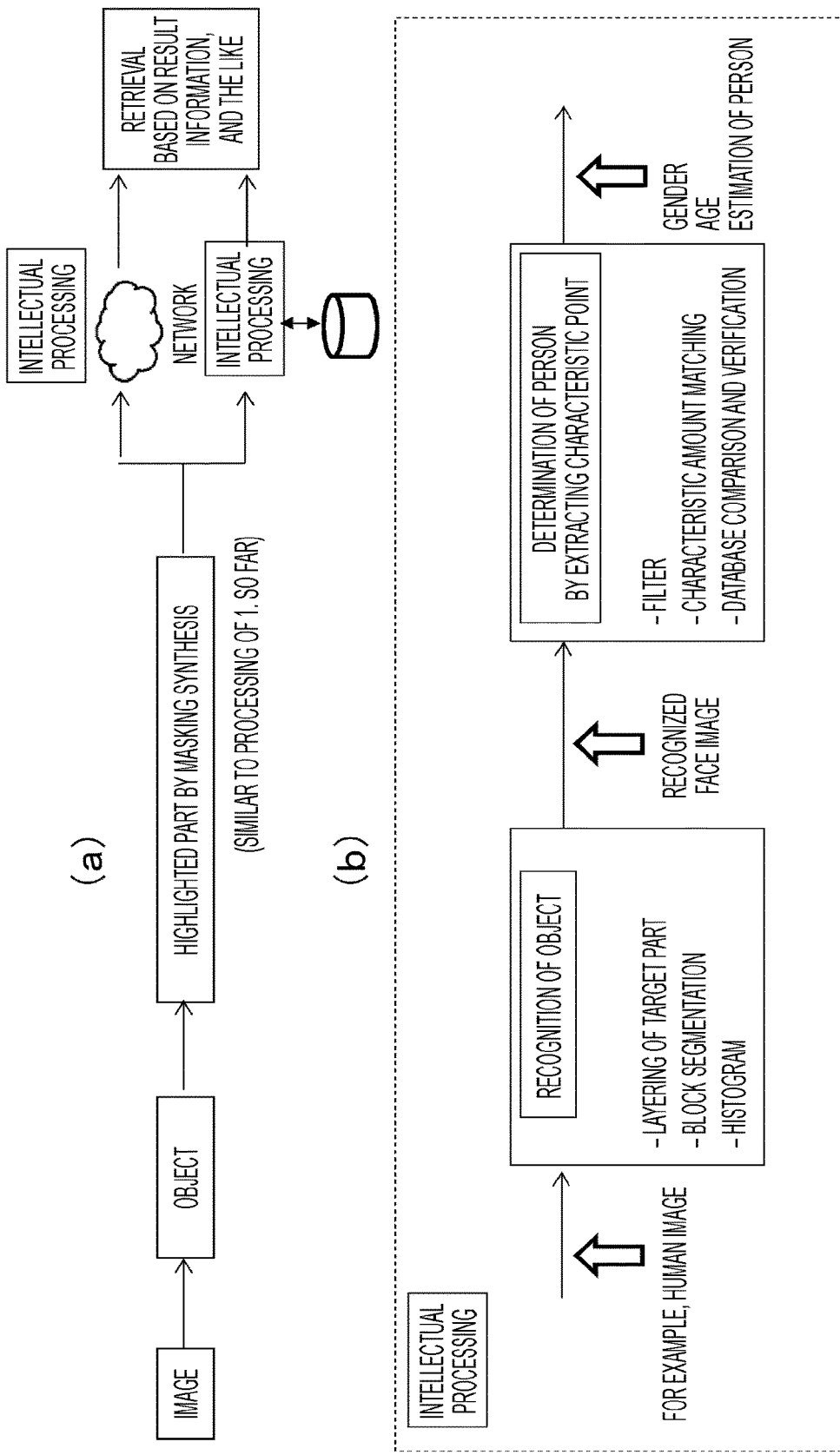
FIG. 16 is a diagram for explaining interactive processing 2 (retrieval by an object+extraction of a characteristic point).

FIG. 16(a) shows the summary of the interactive processing 2, that is, "2. Retrieval by an object (cloud, local storage)+extraction of a characteristic point". In this case, if an operation mode of the interactive processing is set in accordance with user operation, a region frame is displayed in an image displayed on the display unit 207 (refer to FIG. 14). In this state, when one or a plurality of regions is selected by user operation, an image displayed on the display unit 207 is in a state where an object included in a selected region is highlighted. Processing performed so far is the same as the processing in the interactive processing 1 described above.

Thereafter, in a case of this interactive processing, intellectual processing is applied to image data of an object included in the selected region, retrieval and the like are performed for the result information, and processing of further modifying and changing the image data for display is performed so that a retrieval result is displayed. For example, the intellectual processing is performed in a cloud on a network, or a local storage. Note that, in the configuration example of FIG. 12, illustration of a communication interface for performing communication with a cloud on a network and a local storage is omitted.

For example, as shown in FIG. 16(b), in a case where an object is a person, the intellectual processing includes object recognition processing of recognizing a face image, processing of determining a person (gender, age, person estimation) by extracting a characteristic point from the recognized face image, and the like.

"3. Displaying Attributes by Clicking"

In a case of the interactive processing 3, that is, "3. Displaying attributes by clicking", if an operation mode of the interactive processing 3 is set in accordance with user operation, a region frame is displayed in an image displayed on the display unit 207 (refer to FIG. 14).

Figure 17:
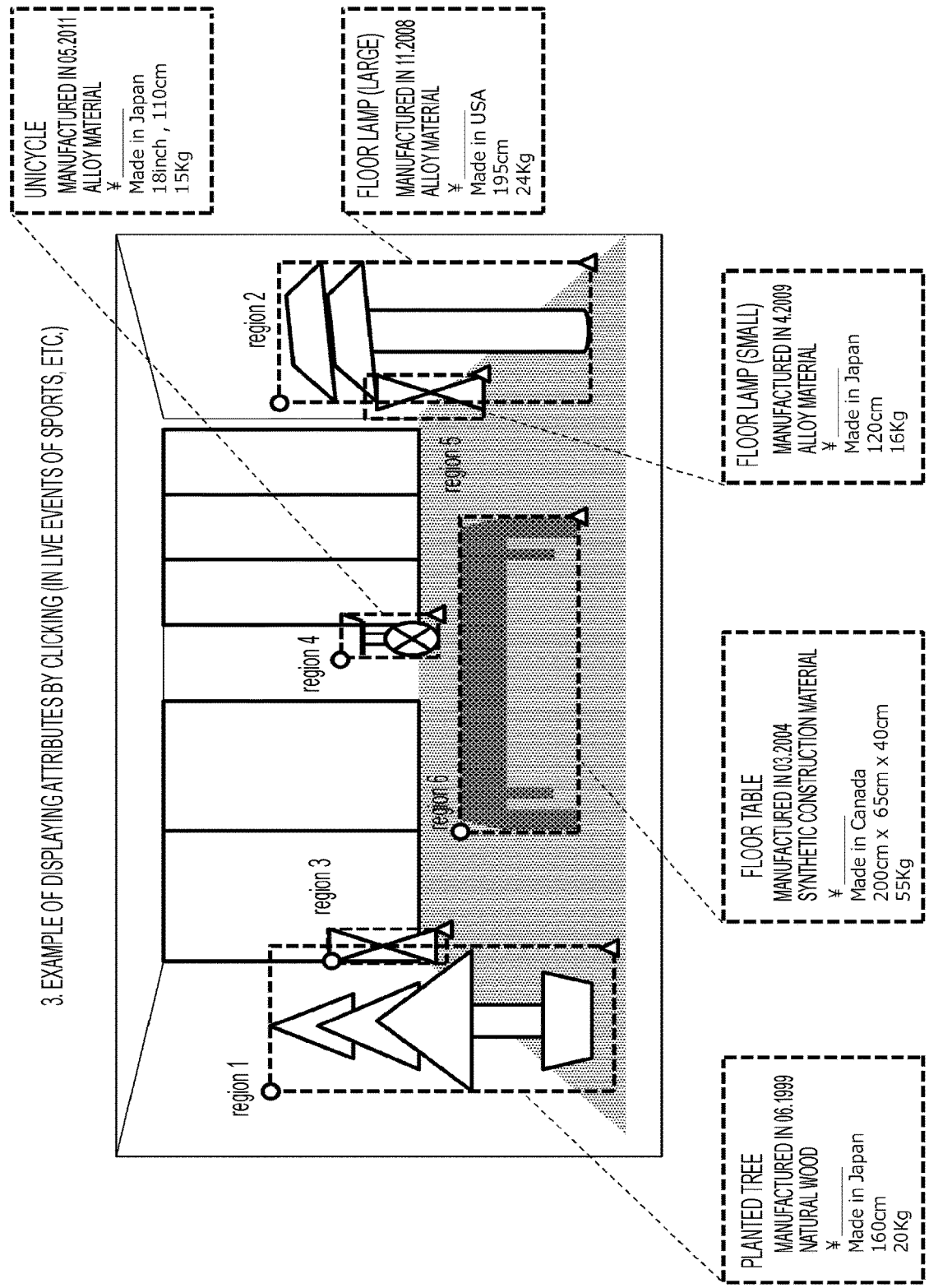
FIG. 17 is a diagram for explaining interactive processing 3 (displaying attributes by clicking).

In this state, when one or a plurality of regions is selected by user operation, attributes of an object included in the selected region are displayed in an image displayed on the display unit 207 as shown in FIG. 17. The illustrated example shows a case where all regions other than region3 are selected. This display of attributes is performed on the basis of text information that explains an object obtained by the semantic region SEI analysis unit 264.

"4. Segmentation Display of Objects on a Plurality of Display Units"

In a case of the interactive processing 4, that is, "4. Segmentation display of objects on a plurality of display units", the display unit 207 is constituted by a plurality of display units arranged on top of each other from a close viewpoint of the user toward a far viewpoint.

For example, if an operation mode of the interactive processing 4 is set in accordance with user operation, a region frame is displayed in an image displayed on a display unit of a closest viewpoint (refer to FIG. 14). In this state, when one or a plurality of regions is selected by user operation, image data for display for each display unit is obtained so that each of objects included in the selected regions is displayed in a display unit at a position corresponding to its degree of priority on the basis of display priority information of the region obtained by the semantic region SEI analysis unit 264.

Figure 18:
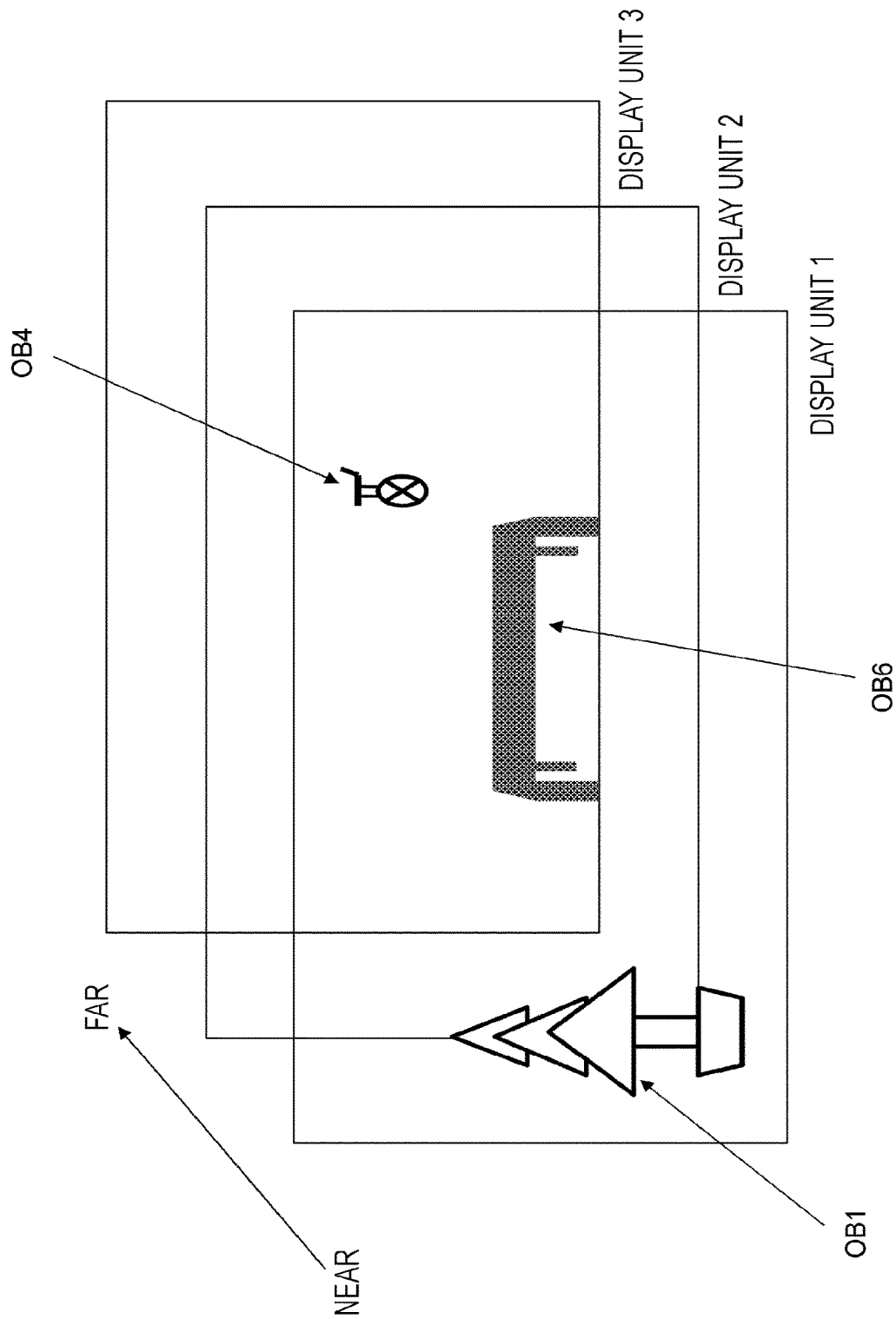
FIG. 18 is a diagram for explaining interactive processing 4 (segmentation display of objects on a plurality of display units).

FIG. 18 shows a display example in a case where region1, region6, and region4 are selected in the example illustrated in FIG. 14. In this case, values of degree of priority are in a relationship of region1<region6<region4. Therefore, an object OB1 included in region1 is displayed in a display unit 1 closest to a viewpoint, an object OB6 included in region6 is displayed on a display unit 2 next closest to the viewpoint, and an object OB4 included in region4 is displayed on a display unit 3 farthest from the viewpoint. In this case, areas other than the object display area of each display unit are in a transparent state, and the user can observe an object displayed on each display unit from a viewpoint with perspective.

Operation of the receiving device 200 shown in FIG. 12 will be described briefly. The receiving unit 203 receives the transport stream TS that is sent on a broadcast wave or a packet on a net from the transmitting device 100. The transport stream TS is supplied to the TS analysis unit 204. The TS analysis unit 204 takes out a video stream included in the transport stream TS, and sends the video stream to the coded picture buffer 205. This video stream includes information of an object together with coded image data for each picture.

The coded picture buffer (cpb) 205 temporarily stores a vide stream sent from the TS analysis unit 204. The decoder 206 reads out and decodes coded image data of each picture stored in the coded picture buffer 205 at a decoding timing provided by a decoding time stamp (DTS) of the picture to obtain image data for display. Furthermore, the decoder 206 performs interactive processing based on information of an object in accordance with user operation to adaptively modify and change the image data for display.

The display unit 207 displays an image based on the image data for display from the decoder 206. In this case, in normal time, image data for display output from the image processing unit 265 is image data for display obtained by the image decoding unit 262. Furthermore, when interactive processing based on interactive operation by the user is performed, image data for display output from the image processing unit 265 is obtained by adaptively modifying and changing image data for display obtained by the image decoding unit 262.

As described above, in the transmitting and receiving system 10 shown in FIG. 1, information of an object detected on the basis of image data is transmitted together with a video stream having coded image data. Therefore, a receiving side can acquire information of an object without the need of detecting the object by processing image data, and without depending on its own performance, and can perform interactive processing based on the information of an object in an excellent manner.

Furthermore, in the transmitting and receiving system 10 shown in FIG. 1, information of an object is transmitted by being inserted into a video stream. Therefore, association of a video stream with information of an object is facilitated.

2. VARIATION

Note that the above embodiment shows an example in which information of an object is transmitted from a transmitting side to a receiving side. However, there may be a case where a receiving side detects information of an object from received image data and performs interactive processing on the basis of the information of an object.

Figure 19:
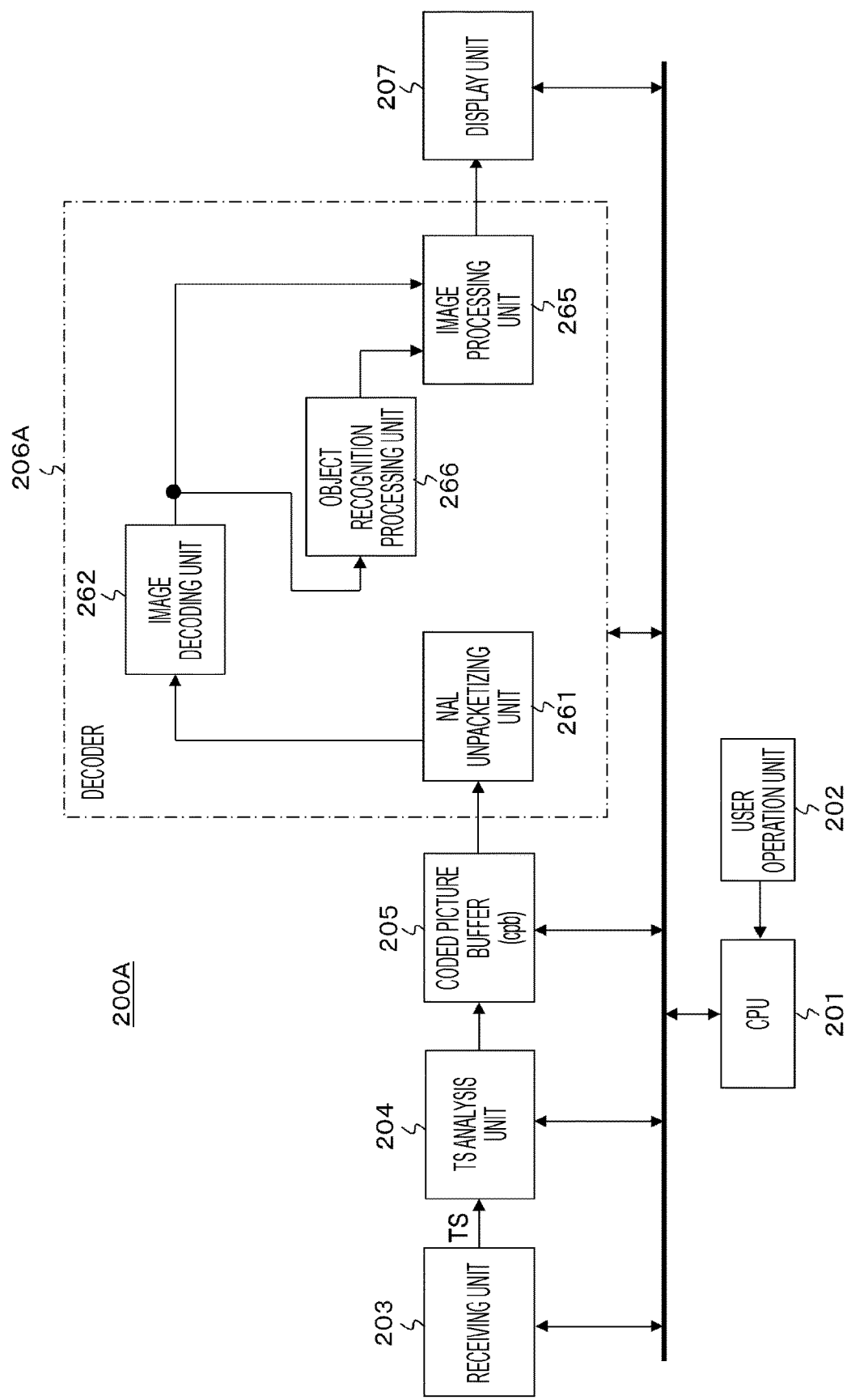
FIG. 19 is a block diagram showing another configuration example of the receiving device.

FIG. 19 shows a configuration example of a receiving device 200A in the above case. In FIG. 19, units corresponding to those in FIG. 12 are attached with the same reference signs, and detailed description of such units is omitted as appropriate. The receiving device 200A includes the CPU 201, the user operation unit 202, the receiving unit 203, the TS analysis unit 204, the coded picture buffer (cpb) 205, a decoder 206A, and the display unit 207.

The decoder 206A reads out and decodes coded image data of each picture stored in the coded picture buffer 205 at a decoding timing provided by a decoding time stamp (DTS) of the picture to obtain image data for display. Furthermore, the decoder 206 detects information of an object on the basis of the image data for display. Then, the decoder 206A performs interactive processing based on information of an object in accordance with user operation to adaptively modify and change the image data for display, and sends the data to the display unit 207.

The decoder 206A has the NAL unpacketizing unit 261, the image decoding unit 262, an object recognition processing unit 266, and the image processing unit (browser unit) 265. The NAL unpacketizing unit 261 takes out slice data, a parameter set, SEI, and the like from a predetermined number of NAL units constituting coded image data of each picture, and sends them to necessary locations.

Here, the NAL unpacketizing unit 261 takes out coded image data of a picture from a NAL unit of a slice that is conventionally well-known, and sends the data to the image decoding unit 262. The image decoding unit 262 decodes coded image data sent for each picture from the NAL unpacketizing unit 261 to obtain image data for display.

As similar to the object recognition processing unit 266 in the encoder 103 of the transmitting device 100 shown in FIG. 2 described above, the object recognition processing unit 266 applies conventionally well-known segmentation processing to the image data for display obtained by the image decoding unit 262 to detect an object, so that information of the object (information indicating a shape of the object, information of a region that is a rectangular area enclosing the object, display priority information of the region, and the like) is obtained.

The image processing unit 265 performs image processing on the basis of the image data for display obtained by the image decoding unit 262 and the information of each object obtained by the object recognition processing unit 266, and image data for display is output. In this case, in normal time, image data for display output from the image processing unit 265 is image data for display obtained by the image decoding unit 262. Furthermore, when interactive processing based on interactive operation by the user is performed, image data for display output from the image processing unit 265 is obtained by adaptively modifying and changing image data for display obtained by the image decoding unit 262.

Furthermore, the embodiment described above shows the transmitting and receiving system 10 including the transmitting device 100 and the receiving device 200. However, the configuration of the transmitting and receiving system to which the present technology may be applied is not limited to the above. For example, the part of the receiving device 200 may be a configuration or the like of a set-top box and a monitor connected by a digital interface, such as a high-definition multimedia interface (HDMI). Note that "HDMI" is a registered trademark.

Furthermore, the above embodiment shows an example where a container is a transport stream (MPEG-2 TS). However, the present technology can be similarly applied to a system having a configuration of distribution to a receiving terminal by using a network, such as the Internet. In distribution over the Internet, distribution is often performed by containers of MP4 and other formats. That is, the containers are containers of various formats, such as a transport stream (MPEG-2 TS) employed in a digital broadcast standard, and MP4 used in internet distribution.

Furthermore, the present technology can take a configuration described below.

(1) A transmitting device, including:
an image encoding unit configured to code image data to obtain a video stream having coded image data; and
a transmitting unit configured to transmit the video stream in a state of being added with information of an object detected on the basis of the image data.

(2) The transmitting device according to (1) described above, in which
the information of an object includes coded data obtained by coding one-bit data showing a shape of the object.

(3) The transmitting device according to (1) or (2) described above, in which
the object information includes information of a region that is a rectangular area enclosing the object.

(4) The transmitting device according to (3) described above, in which
the object information further includes display priority information of the region.

(5) The transmitting device according to any of (1) to (4) described above, in which
the object information includes text information that explains the object.

(6) The transmitting device according to any of (1) to (5) described above, in which
the information of an object is transmitted by being inserted into the video stream.

(7) The transmitting device according to (6) described above, in which
the object information at least includes coded data obtained by coding one-bit data showing a shape of the object and information of a region that is a rectangular area enclosing the object, and
the coded data is inserted into a first area in the video stream, and the information of a region is inserted into a second area that is different from the first area in the video stream.

(8) A transmitting method, including:
an image encoding step for causing an image encoding unit to code image data to obtain a video stream having coded image data; and
a transmitting step for causing a transmitting unit to transmit the video stream in a state of being added with information of an object detected on the basis of the image data.

(9) A receiving device including a receiving unit configured to receive a video stream having coded image data obtained by coding image data, in which
the video stream is added with information of an object detected on the basis of the image data,
the receiving device further including a control unit configured to control interactive processing performed on the basis of the information of an object.

(10) The receiving device according to (9) described above, in which
the interactive processing is processing of highlighting a predetermined object selected on the basis of the information of an object.

(11) The receiving device according to (9) or (10) described above, in which the interactive processing is processing of acquiring predetermined information by analyzing an image of a predetermined object selected on the basis of the information of an object.

(12) The receiving device according to any of (9) to (11) described above, in which the interactive processing is processing of displaying information relating to a predetermined object selected on the basis of the object information.

(13) A receiving method including a receiving step for causing a receiving unit to receive a video stream having coded image data obtained by coding image data, in which the video stream is added with information of an object detected on the basis of the image data, the receiving method further including a controlling step for causing a control unit to control interactive processing performed on the basis of the information of an object.

(14) A receiving device, including:

a receiving unit configured to receive a video stream having coded image data obtained by coding image data; and a control unit configured to control processing of detecting information of an object on the basis of the image data obtained by decoding the coded image data, and interactive processing performed on the basis of the information of an object.

(15) A receiving method, including:

a receiving step for causing a receiving unit to receive a video stream having coded image data obtained by coding image data; and a controlling step for causing a control unit to control processing of detecting information of an object on the basis of image data obtained by decoding the coded image data, and interactive processing performed on the basis of the information of an object.

A main characteristic of the present technology is that information of an object detected on the basis of image data is transmitted together with a video stream having coded image data obtained by coding the image data. In this manner, a receiving side can obtain information of an object without the need of detecting the object by processing the image data and without depending on its own performance, and may perform interactive processing based on the information of an object in an excellent manner (refer to FIG. 2).

REFERENCE SIGNS LIST

10 Transmitting and receiving system
100 Transmitting device
101 CPU
102 User operation unit
103 Encoder
104 Coded picture buffer
105 TS formatter
106 Transmitting unit
131 Image encoding unit
132 Object recognition processing unit
133 Region encoding unit
134 Parameter set/SEI encoding unit
135 NAL packetizing unit
141 Subtraction circuit
142 Motion prediction/motion compensation circuit
143 Integer conversion/quantization circuit
144 Inverse quantization/inverse integer conversion circuit
145 Addition circuit
146 Loop filter
147 Memory
148 Entropy coding circuit
200 Receiving device
201 CPU
202 User operation unit
203 Receiving unit
204 TS analysis unit
205 Coded picture buffer
206 Decoder
207 Display unit
261 NAL unpacketizing unit
262 Image decoding unit
263 Region decoding unit
264 Semantic region SEI analysis unit
265 Image processing unit
271 Entropy decoding circuit
272 Inverse quantization/inverse integer conversion circuit
273 Motion compensation circuit
274 Addition circuit
275 Loop filter
276 Memory

The invention claimed is:

1. A transmitting device, comprising:
   circuitry configured to:
   code image data to obtain a video stream having coded image data;
   transmit the video stream added with information of an object, the object being detected based on the image data, wherein
   the information of the object includes at least priority information of a region that is an area enclosing the object, and the priority information indicates a level of importance of the object.

2. The transmitting device according to claim 1, wherein the information of the object includes coded data obtained by coding one-bit data showing a shape of the object.

3. The transmitting device according to claim 1, wherein the information of the object includes information of the region that is a rectangular area enclosing the object.

4. The transmitting device according to claim 1, wherein the information of the object includes text information that explains the object.

5. The transmitting device according to claim 1, wherein the information of the object is transmitted by being inserted into the video stream.

6. The transmitting device according to claim 5, wherein the information of the object at least includes coded data obtained by coding one-bit data showing a shape of the object and information of the region that is a rectangular area enclosing the object, and
   the coded data is inserted into a first area in the video stream, and the information of the region is inserted into a second area that is different from the first area in the video stream.

7. A receiving device, comprising:
   circuitry configured to:
   receive a video stream having coded image data obtained by coding image data, wherein the video stream is added with information of an object, the object being detected based on the image data, the information of the object includes at least priority information of a region that is an area enclosing the object, and the priority information indicates a level of importance of the object; and
   control interactive processing performed based on the information of the object.

8. The receiving device according to claim 7, wherein
the interactive processing is processing of highlighting a predetermined object selected based on the information of the object.

9. The receiving device according to claim 7, wherein
the interactive processing is processing of acquiring predetermined information by analyzing an image of a predetermined object selected based on the information of the object.

10. The receiving device according to claim 7, wherein
the interactive processing is processing of displaying information relating to a predetermined object selected based on the information of the object.

11. A receiving device, comprising:
circuitry configured to:
receive a video stream having coded image data obtained by coding image data; and
control processing of detecting information of an object based on the image data obtained by decoding the coded image data, and interactive processing performed based on the information of the object, wherein the information of the object includes at least priority information of a region that is an area enclosing the object, and the priority information indicates a level of importance of the object.

* * * * *